Patented Jan. 21, 1941

2,229,534

UNITED STATES PATENT OFFICE 2,229,534

METHOD OF COMPOUNDING RUBBER

Charles W. Walton, Stow, Ohio, assignor to Wingfoot Corporation, Wilmington, Del., a corporation of Delaware No Drawing. Application September 24, 1937, Serial No. 165,531

7 Claims. (Cl. 260—821)

This invention relates to a method of compounding rubber. More particularly, it relates to a method of preparing crumb rubber in which is incorporated carbon black. It also includes the rubber powder so formed.

A number of methods are known for preparing filterable masses of rubber from latex by flocculation, and some of these methods are particularly directed toward the production of a rubber crumb or powder. Descriptions of these processes often include mention of the fact that various compounding ingredients may be added if desired. It has been found, however, that if carbon black, a widely used compounding ingredient, is dispersed in latex and the mixture is then flocculated by the addition of aluminum chloride or similar flocculating agent, while a filterable flocculated product containing the carbon black is indeed obtained, it is very difficult to prepare by this method a crumb or powdered rubber composed of discrete particles. The addition of the carbon black seems in some way to promote the adhesiveness of the rubber particles so that they cohere to such an extent that it is extremely difficult, if not impossible, to subdivide and dry the compounded rubber to obtain a powder of non-cohering particles.

The present invention provides a method for flocculating latex containing carbon black so that the flocs formed are capable of reduction to a rubber powder consisting of discrete non-coherent particles. According to the invention, the carbon black is added to the latex, together with a small amount of a water-soluble silicate, and this mix is flocculated with an acidic salt of aluminum, such as the chloride or sulfate. It is found that a flocculated rubber so prepared can then be used for the production of rubber powder. However, when the silicate is used in sufficient amount, there is a detrimental effect on the ageing properties of the finished rubber product. This ageing effect is obviously a serious drawback. It therefore becomes necessary to use a limited amount of the silicate to minimize this detrimental effect. It has been found that if an amount of silicate of not more than about 10% of the rubber content of the latex be used, a powdered product can be obtained, even with high carbon black loadings as used in tread stocks, without substantially reducing the resistance to ageing of the finished product. With lower loadings of carbon black, smaller amounts of the silicate will give satisfactory results and it is desirable in any given case to use as little silicate as possible while obtaining a flocculated rubber which lends itself to the production of a non-cohering, dry rubber powder.

The mechanism of the process of the invention is not known with exactness but there is good reason for believing that the flocculated particles of rubber containing carbon black are coated by an adsorbed or otherwise deposited film or coating of the reaction product of the water soluble silicate and the acidic salt of aluminum and that this film or "skin" over the surface of each flocculated rubber particle serves to reduce the adhesiveness of the particles and to preserve their individually on further processing to powdered or crumb rubber. As the aluminum salt is added to the latex, the rubber flocculates at a pH of about 7.0. Further addition reduces the pH to the point at which the aluminum salt and the water soluble silicate react. For example, according to Hydrogen Ions (Van Nostrand 1929) by Britton at pages 307-310 the reaction product of aluminum chloride and sodium silicate forms at a pH of about 4.04-4.14. In no case, however, is it necessary to go to a pH less than about 3.0.

Any water soluble silicate such as ammonium silicate or the silicates of the alkali metals may be employed in the practice of the invention but the readily available sodium silicate, or water glass, gives excellent results and is the preferred material.

The following example demonstrates the practice of the invention:

| | Parts by weight |
|---|---|
| Rubber as latex | 100 |
| Carbon black | 50 |
| Sodium silicate | 5 |

The sodium silicate was added to the latex, and the mixture diluted by a volume of water equal to the volume of latex used. The carbon black was then dispersed in water in the ratio of one part of carbon black to nine parts of water using as a dispersing agent Vultamol, a commercial material which is the sodium salt of an organic thio acid. This dispersion was diluted to 5% carbon black with water and was then added to the latex, the two components being thoroughly mixed to obtain a good dispersion of the carbon black throughout the latex. Flocculation of the mixture was then accomplished by adding sufficient dilute aqueous solution of aluminum chloride, to the latex-carbon black mixture to obtain a pH of about 4.0 in the resulting slurry.

Water was removed from the flocculated mass until it became cheese-like in consistency. The moist cake was then crumbled to a fine powder and air dried at room temperature. The final product was a fine powder which was non-tacky and could be easily handled, even lending itself to further mechanical disintegration. After a slight amount of mechanical working on a mill a coherent mass of rubber with excellent dispersion of the carbon black and good resistance to ageing was obtained.

The quantity of silicate employed may be somewhat reduced if to the latex before flocculation are added certain other stabilizing and dispersing agents, such as casein, gum arabic, gum tragacanth, gelatin, etc. The following example demonstrates the use of casein with sodium silicate:

|  | Parts by weight |
|---|---|
| Rubber as latex | 100 |
| Carbon black | 50 |
| Casein | 1 |
| Sodium silicate | 3 |

The casein in the form of sodium caseinate and the sodium silicate were added to the latex, and the latex mixture was diluted by a volume of water equal to the volume of latex used. The carbon black was dispersed in water in the ratio of one part of carbon black to nine parts of water using 2 parts of Vultamol, and this dispersion was diluted to 5% carbon black with more water. The carbon black dispersion was then added to, and thoroughly dispersed through, the latex mixture. The mixture was then flocculated by addition of sufficient dilute solution of aluminum chloride to obtain a final pH in the resultant slurry of about 4.0. The slurry was dewatered until a crumbly cake was obtained and this was reduced to a powder which was allowed to dry at room temperature. This powder, as in the example previously given, was non-tacky and could be readily handled.

The specific examples given are illustrative and not limitative of the invention which comprises the addition of soluble silicates to mixtures of latex and carbon black and the flocculation of these mixtures with acidic salts of aluminum, such as aluminum chloride and aluminum sulfate in the preparation of rubber powder containing carbon black with or without other compounding ingredients.

While only the preferred forms of the invention have been described in detail, it will be apparent to those skilled in the art that various modifications may be made therein without departing from the spirit of the invention or the scope of the appended claims in which it is intended to cover by suitable expression all patentable novelty residing in the invention.

What I claim is:

1. A process for preparing a rubber powder containing carbon black which comprises adding to latex, carbon black and not more than 10% of an inorganic water soluble silicate based on the rubber content of the latex, flocculating the rubber with an acidic salt of aluminum, forming a moist, crumbly cake, disintegrating the moist cake to powder, and drying the thus prepared compounded rubber powder.

2. A process for preparing a rubber powder containing carbon black which comprises adding to latex, carbon black and about 5% of sodium silicate based on the rubber content of the latex, flocculating the rubber with aluminum chloride, forming a moist, crumbly cake, disintegrating the moist cake to powder, and drying the thus prepared compounded rubber powder.

3. A process for preparing a rubber powder containing carbon black which comprises adding to latex, carbon black, about 3% of an inorganic water soluble silicate based on the rubber content of the latex, and a small amount of a substance selected from the group consisting of casein, gum arabic, gum tragacanth, and gelatin, flocculating the rubber with an acidic salt of aluminum, forming a moist, crumbly cake, disintegrating the moist cake to powder, and drying the thus prepared compounded rubber powder.

4. A process for preparing a rubber powder containing carbon black which comprises adding to latex, carbon black and about 3% of sodium silicate and about 1% of casein based on the rubber content of the latex, flocculating the rubber with aluminum chloride, forming a moist, crumbly cake, disintegrating the moist cake to powder, and drying the thus prepared compounded rubber powder.

5. A process for preparing a rubber powder containing carbon black which comprises adding to latex, carbon black and not more than 10% of an inorganic water soluble silicate based on the rubber content of the latex, flocculating the rubber with a sufficient quantity of an acidic salt of aluminum to obtain a final acidity in the resultant slurry equivalent to a pH of not less than 3.0, forming a moist, crumbly cake, disintegrating the moist cake to powder, and drying the thus prepared compounded rubber powder.

6. A process for preparing a rubber powder containing carbon black which comprises adding to latex, carbon black and not more than 10% of sodium silicate based on the rubber content of the latex, flocculating the rubber with sufficient aluminum chloride to obtain a final acidity in the resultant slurry equivalent to a pH of about 4.0, forming a moist, crumbly cake, disintegrating the moist cake to powder, and drying the thus prepared compounded rubber powder.

7. A free-flowing rubber powder having carbon black distributed therethrough and an adsorbed surface coating of precipitated aluminum silicate, the latter being present in amount not greater than 10% of the weight of the rubber.

CHARLES W. WALTON.